United States Patent
Innis et al.

[15] 3,707,650
[45] Dec. 26, 1972

[54] PROTECTIVE SYSTEM FOR SERIES CAPACITORS

[72] Inventors: Robert T. Innis, Ellettsville; Alan J. Berg; James N. Santilli, both of Bloomington, all of Ind.

[73] Assignee: Westinghouse Electric Corporation, Pittsburgh, Pa.

[22] Filed: May 22, 1969

[21] Appl. No.: 826,977

[52] U.S. Cl.................317/12 A, 317/36 TD, 317/59
[51] Int. Cl................................................H02h 7/16
[58] Field of Search ...317/12, 12.1, 36, 59; 337/320; 261/61.1; 137/505.18, 489; 251/30

[56] References Cited

UNITED STATES PATENTS

| | | | |
|---|---|---|---|
| 2,584,710 | 2/1952 | Johnson | 317/12.1 |
| 2,949,567 | 8/1960 | Johnson | 317/12.1 |
| 3,385,941 | 5/1968 | Marbury | 317/12 X |
| 3,473,089 | 10/1969 | Cuttino | 317/12 |
| 862,867 | 8/1907 | Eggleston | 261/61.1 X |
| 2,788,192 | 4/1957 | Mountford | 137/505.18 X |
| 3,090,592 | 5/1963 | Fleer | 251/30 |
| 3,282,552 | 11/1966 | Sommese | 251/30 |

Primary Examiner—J. D. Miller
Assistant Examiner—Harvey Fendelman
Attorney—A. T. Stratton and F. P. Lyle

[57] ABSTRACT

Time delay means for actuating a protective bypass switch for series capacitors comprising a bellows device containing a gaseous medium, a valve means pneumatically connected to the bellows, and an adjustable control orifice device, the control orifice being effective to release the gaseous medium from the bellows at a predetermined rate when an overcurrent condition is sensed on the line, the bellows being effective to actuate the protective switch a predetermined time after the overcurrent is sensed.

5 Claims, 1 Drawing Figure

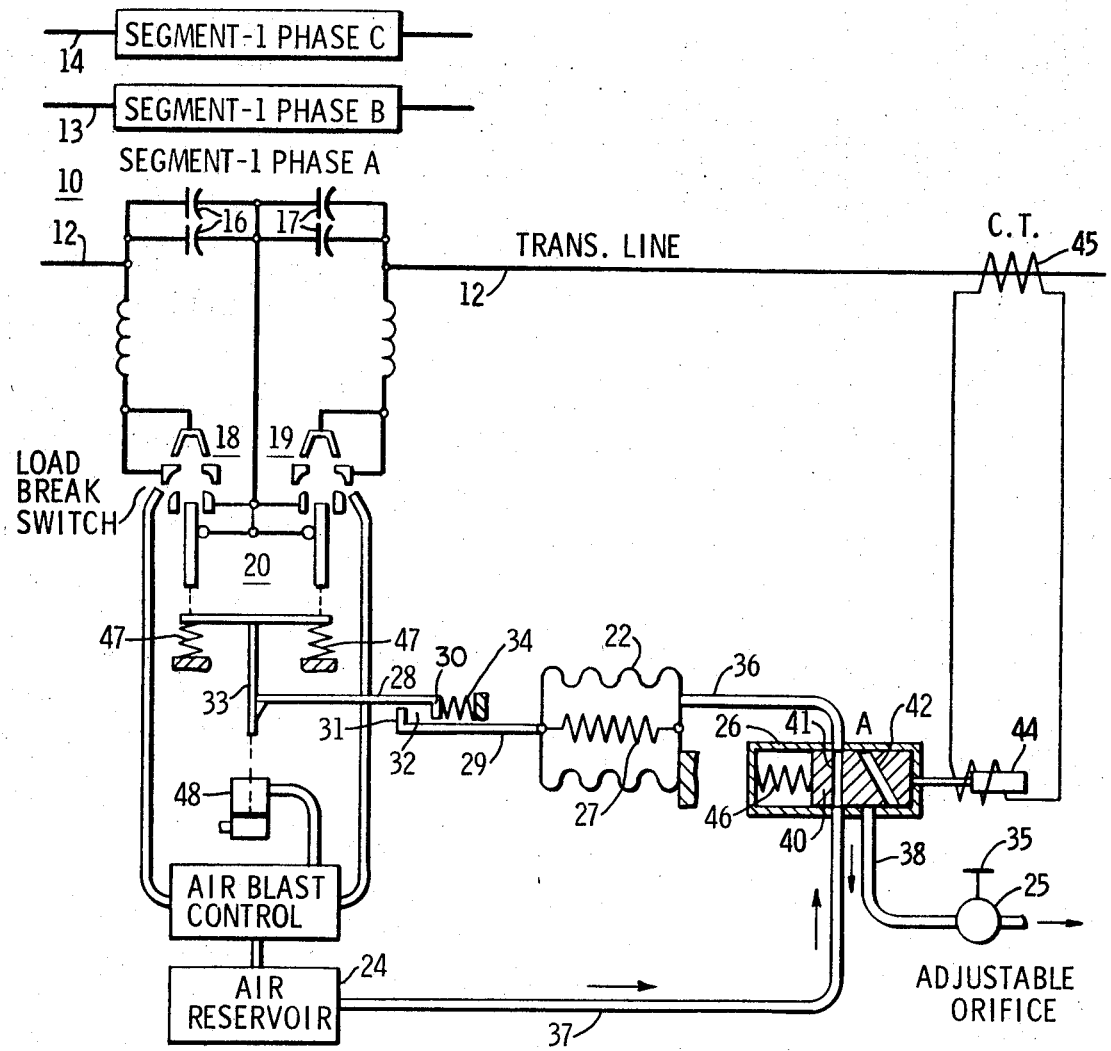

PROTECTIVE SYSTEM FOR SERIES CAPACITORS

BACKGROUND OF THE INVENTION

The present invention relates generally to means for controlling the operation of protective switching devices, and particularly to a pneumatic arrangement providing a constant time delay characteristic for the operation of protective bypass switches in multiple phase, series capacitor installations.

In the specific case of series capacitor installations, bypass switches are used in conjunction with bypass gaps for protectively bypassing the capacitors which are usually connected in a three-phase transmission line. The switches bypass the capacitors and gaps under sustained fault or overcurrent conditions, and in addition can be operated to vary, preferably with phase impedance balance, the total amount of series capacitive reactance in the transmission line. The bypass gaps arc over to provide an instantaneous discharge path for the overcurrent, the arcs being extinguished (either at each voltage zero or when the current returns to normal) by a blast of air or other suitable gaseous medium directed to the gaps from a pressurized supply of the medium associated with each installation. For a fuller description of the operation and utility of series capacitor installations in transmission lines, and of pertaining mechanical structure and electrical circuitry, reference is made to U.S. Pat. Nos. 3,335,362 and 3,385,941 issued to W. H. Cuttino and R. E. Marbury, respectively, on Aug. 9, 1967 and May 28, 1968, both assigned to the present assignee.

Since the capacitors are connected in series in the line, they must be protected against overvoltage across the capacitors resulting from fault currents or other overcurrents in the line. Spark gaps are connected across the capacitors for this purpose to bypass the capacitors instantaneously upon the occurrence of a predetermined overvoltage across the capacitors. In most cases the fault will be cleared very rapidly by operations of line circuit breakers, or other means, and the arc in the bypass gap can then be extinguished to remove the bypass. In some cases, however, the fault or other overcurrent may persist, resulting in continued arcing of the bypass gaps and the bypass switches are then closed to protect both the gaps and capacitors until the line current has returned to normal when the switches can be reopened.

This operation has usually been obtained by means of of time delay relays operated by current transformers in response to line current to cause the bypass switches to close if an overcurrent persists for more than a predetermined time. Induction disc type relays have usually been used for this purpose. Such relays, however, have limited characteristics and because of the varying magnitudes and wide range of frequencies of the fault currents that may occur, it has been difficult to obtain reliable and consistent time delays and insulation problems have frequently been encountered.

BRIEF SUMMARY OF THE INVENTION

The present invention provides a bypass switch actuating or closing arrangement having a time delay characteristic that is independent of current and thus is constant for substantially all line current magnitudes and frequencies. This is accomplished by means of a bellows device containing air or other gaseous medium supplied thereto through a normally open valve from an air reservoir associated with the capacitor installation. When an overcurrent condition is sensed on the line, the valve is operated by a solenoid to open an exhaust orifice and close the bellows off from the reservoir. The orifice releases the gas at a precise, predetermined rate independent of the line current frequency and magnitude. Upon release of the gas, the bellows contracts to effect closing of the bypass switch.

THE DRAWING

The invention, along with its advantages and objectives, will be more apparent from the following detailed description, taken in connection with the accompanying drawing, in which the sole FIGURE shows a schematic representation of a bypass switch actuating arrangement constructed in accordance with the principles of the invention.

There is shown in the drawing a series capacitor installation 10 in a three-phase transmission line, the phases being designated A, B and C respectively. A capacitor segment is connected in series in each of the phase conductors 12, 13 and 14, each segment consisting of a suitable number of capacitors 16 and 17 connected in any suitable series-parallel arrangement. Only one segment is shown in each phase but it will be understood that one or more additional segments may be connected in series with those shown. Each of the capacitor segments is provided with the necessary protective and control equipment and, since all of the segments are identical, only the protective equipment of the phase A capacitor segment has been shown in the drawings.

The capacitors 16 and 17 are protected by spark gaps and bypass switches connected across them, the switches normally being open. As shown diagrammatically in the drawing, the gaps and switches are preferably combined in protective devices 18 and 19 of the type disclosed in the above-mentioned Marbury patent, and the two devices shown for the two halves of the capacitor segment may have a common switch actuating mechanism 20 as described in the Marbury patent. As previously explained, the spark gaps provide instantaneous protection for the capacitors against overvoltages resulting from fault currents or other excessive currents in the line. If the overcurrent persists for too long a time, the gap may be damaged by continued arcing and the switch is closed to bypass both the gap and the capacitor. For this purpose time delay means are provided responsive to the line current to effect closing of the switch in response to overcurrent after a predetermined time delay which is made long enough to permit normal clearing of a fault so that the switch is not closed unless the fault current persists beyond the normal fault clearing time.

The present invention provides a consistent, constant time delay characteristic for actuating the closing mechanism 20 of the bypass switch after the occurrence of fault current on the line. For this purpose, there is provided a bellows device 22 mechanically coupled to the bypass switch 20 to effect tripping thereof, and pneumatically connected to a reservoir or supply 24 of pressurized air or other gaseous medium, and to an adjustable orifice device 25 through a three-way valve structure 26. The reservoir 24 may be the main air supply of the system which also supplies an air blast through suitable control means for extinguishing arcs in the gap and in the switch to give the switch load break characteristics.

The bellows device 22 is provided with a biasing tension spring 27, and is coupled to the bypass switch 20 by means which will allow some movement before actual tripping of the switch is effected. In the FIGURE, this is provided by two L-shaped arms 28 and 29 having spaced-apart, overlapping portions 30 and 31, respectively, the space between said portions being designated 32. The left-hand end of the arm 28 is shown disposed in latching engagement with a vertical operating rod 33 of the bypass switch. The arm 28 is biased to the latching position by a spring 34. The arm 29 is attached to the bellows to be translated by the movement of the bellows.

The adjustable orifice device 25 is a control orifice of the type that provides precise, preselected control of the orifice size so that precise fixed control of the fluid passing therethrough is effected. In the drawing, the adjustable, selectable feature is indicated diagrammatically by a handle 35.

The bellows 22 is pneumatically connected to the valve 26 by a conduit 36, and to the air supply 24 through the valve by a conduit 37. Similarly, the orifice device 25 is shown connected to the valve by a conduit 38, and through the valve to the bellows through the conduit 36.

As indicated somewhat diagrammatically in the FIGURE, the valve 26 is a three-way type device having a first or normally open position between the conduits 36 and 37, and a second position between the conduits 36 and 38 and the control orifice 25. The valve 26 may be of any suitable type and is shown as having a movable piston 40 with openings or passageways 41 and 42 extending transversely therethrough. Thus, in its first position, as shown in the FIGURE, the passageway 41 places the bellows 22 in fluid communication with the gas reservoir 24 through conduits 36 and 37, while in the second position of the valve the bellows is in communication with the orifice 25 through conduits 36 and 38.

The piston 40 of the valve 26 is mechanically connected to a solenoid 44 which is electrically coupled to the line 12 by a current transformer 45. The piston is biased in the position shown in the FIGURE by a return spring 46.

In the operation of the invention as thus far described, with the current on the line 12 being normal, the solenoid 44 is not energized and the valve 26 remains as shown in the drawing. Thus, the opening 41 in the piston 40 of the valve is in alignment with valve ports (not shown) for the valve connecting ends of the conduits 36 and 37. Pressurized air or other suitable gas from the reservoir 24 is thereby conducted to the bellows 22 to fill the same so that the bellows is expanded (to the left in the drawing) against the force of the spring 27. The portion 31 of the arm 29 is thereby translated a spaced distance from the corresponding portion 30 of the arm 28 as shown. Further, the portion of the valve piston containing the opening 42 is in a closed position so that the control orifice is not in fluid communication with the conduit 36 and the bellows.

When a predetermined overcurrent occurs on the line 12, current flow takes place in the circuit of the current transformer 45 and solenoid 44. The solenoid is thereby energized to thrust the piston 40 to the left (in the drawing) against the force of the return spring 46. When this occurs, the supply of gas from the reservoir 24 is cut off, and the control orifice 25 is placed in fluid communication with the bellows and the conduit 36 through the opening 42 in the valve piston. The bellows now begins to lose the gas contained therein and the spring 27 forces the bellows to contact. The gas is lost to the atmosphere through the control orifice at a desired rate, the rate being determined by the adjustable setting of the orifice. Thus, the bellows contracts at the desired rate, the arm 29 moving to the right (in the drawing), the portion 31 thereof moving through the space 32 until it engages the portion 30 of the arm 28. The movement of the arm 29 pulls the arm 28 to the right to release the rod 33 and permit the bypass switches to be closed by the closing springs 47.

When the current on the line 12 returns to normal, the solenoid 44 is deenergized, and the spring 46 returns the piston 40 of the valve 26 to its normal position. The opening 41 in the piston is again in alignment with the conduits 36 and 37 so that the bellows 22 is refilled from the reservoir 24, and the conduit 38 is closed off thereby closing the path between the control orifice 25 and the bellows.

As the bellows 22 refills, it expands (to the left in the drawing) thereby releasing the arm 28 for latching engagement with the rod 33 of the bypass switch 20. The bypass switch may be opened by the application of air or gas to a cylinder 48 mechanically connected to the switch as shown diagrammatically in the drawing. The control of the gas application for opening the switch may be effected in the manner shown in the above-mentioned Cuttino patent or in any other suitable manner, either automatically or manually.

If the fault is cleared, and the line current returns to normal, within the time delay period, that is, before the arm 29 engages the arm 28, the valve 26 returns to its normal position to expand the bellows 22 and the bypass switch remains open.

As seen from the above description, the structure and operation of the invention involve the use of simple mechanical devices, yet the invention provides a precise timing control by use of the adjustable control orifice 25. No induction type relays are required, the only electrical device employed being the valve operating solenoid 44. Thus, operation is independent of line current magnitude and is not affected by varying frequency, but provides a constant, easily adjustable time delay.

Though the invention has been described with a certain degree of particularity changes may be made therein without departing from the spirit and scope thereof.

What is claimed is:

1. In a protective system for capacitors connected in series in an alternating current line, said system including a spark gap device connected across at least some of the capacitors and a bypass switch connected across said capacitors and gap device, means for biasing said bypass switch to closed position, latch means for normally holding the bypass switch in open position, actuating means for causing said latch means to release the bypass switch in response to continued arcing in the spark gap device, said actuating means including time delay means comprising a bellows device, said bellows device being normally held in expanded position by internal gas pressure, means responsive to current flow in said gap device to effect release of gas from the bellows device at a predetermined rate to permit the bellows device to collapse, and means controlled by collapse of the bellows device to actuate the latch means.

2. The system defined in claim 1 in which the current responsive means includes valve means for normally connecting the bellows device to a source of gas pressure and for effecting release of gas at a predetermined rate in response to current flow in the gap device.

3. The system defined in claim 2 in which the valve means connects the bellows device to an adjustable control orifice to permit release of gas at a predetermined rate in response to current flow in the gap device.

4. The system defined in claim 1 in which the bellows device has means for engaging the latch means to release the bypass switch when the bellows device has collapsed a predetermined amount.

5. The system defined in claim 1 in which the current responsive means includes valve means for normally connecting the bellows to a source of gas pressure and for connecting the bellows to a control orifice to permit release of gas and collapse of the bellows at a predetermined rate in response to current flow in the gap device, and the bellows has means for engaging the latch means to release the bypass switch upon collapse of the bellows.

* * * * *